May 5, 1959 D. A. CAMPBELL ET AL 2,885,224
INSULATED METER CONNECTING PIPE JOINT
Filed March 10, 1954
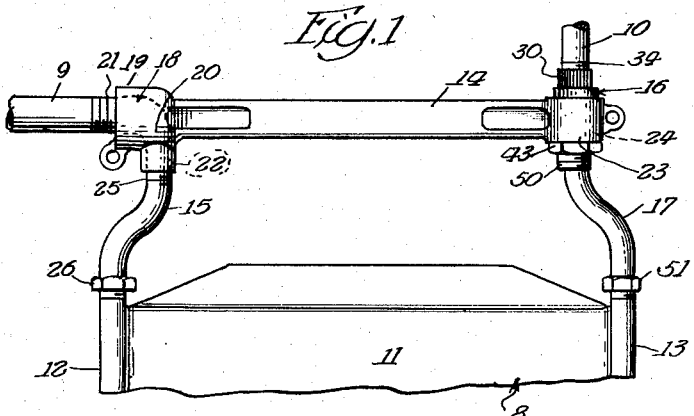
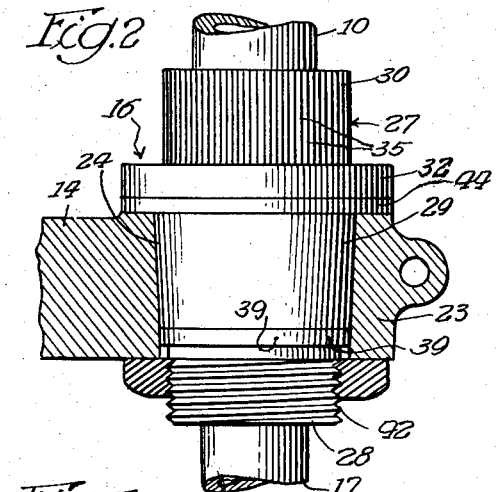
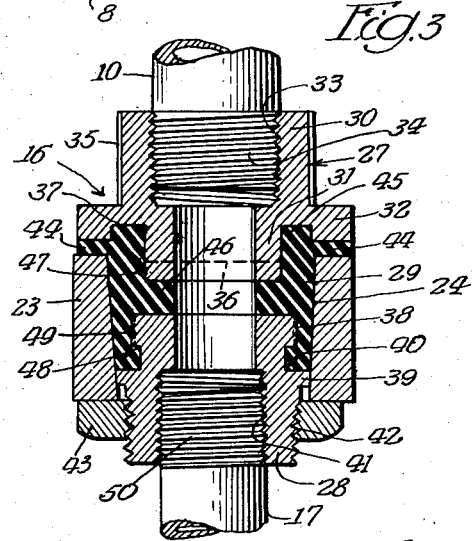
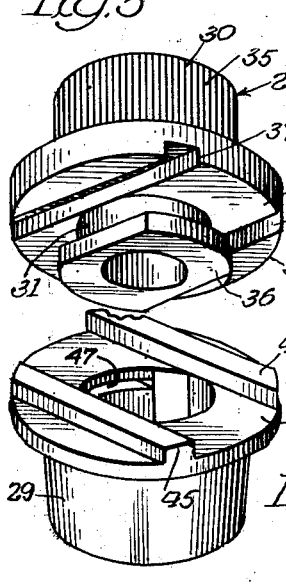
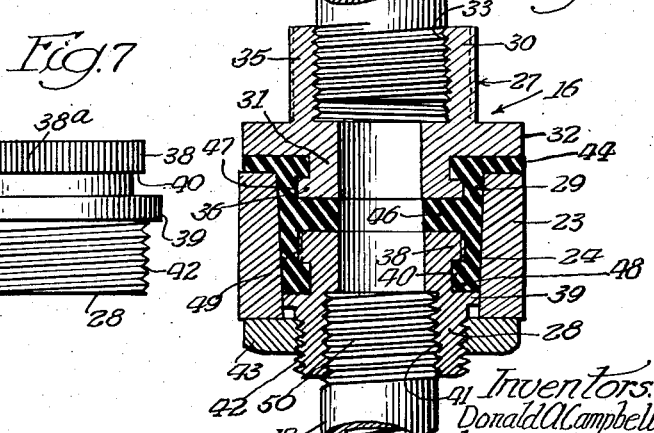
Inventors
Donald A. Campbell
Gerald L. Anderson
By Fred Gerlach atty.

United States Patent Office 2,885,224
Patented May 5, 1959

2,885,224

INSULATED METER CONNECTING PIPE JOINT

Donald A. Campbell and Gerald L. Anderson, Rockford, Ill., assignors to Eclipse Fuel Engineering Co., Rockford, Ill.

Application March 10, 1954, Serial No. 415,266

2 Claims. (Cl. 285—30)

The present invention relates generally to devices for connecting gas meters to gas service and house pipes. More particularly, the invention relates to that type of meter connecting device which comprises a horizontally extending crossbar having at one end thereof means for connecting one of the meter tubes to one of the pipes and embodying at its other end a vertically extending rotatably mounted sleeve and a depending coupling nipple for connecting the other meter tube to the other pipe.

It has heretofore been customary in a meter connecting device of the aforementioned type to form all of the parts of metal and to have the parts in metal to metal contact. It is now common practice in a building having a meter connecting device of the type under consideration for the occupant of the building to ground radios, television receivers and other electrical apparatus to the house pipe, i.e. the pipe that leads from the meter to the various gas consuming units or devices in the building. If the various parts of the meter connecting device are formed of metal and the house pipe with which the device is associated is used to ground radios, television receivers and other electrical apparatus, the meter connecting device operates to conduct electric current from the house pipe to the gas supply pipe and the latter in turn conducts the current to the gas main which is located exteriorly of the building and is generally buried in the ground. If electric current is conducted to the gas main, electrolysis occurs with the result that the gas main deteriorates.

One object of this invention is to provide a meter connecting device which is an improvement upon, and has certain advantages over, previously designed all metal meter connecting devices and is characterized by the fact that it embodies simple and novel means for insulating the gas supply pipe from the gas service pipe to the end that if the house pipe is used as a ground, no electric current is conducted by the supply pipe to the exteriorly disposed buried gas main and hence, deterioration of the main is curtailed or avoided.

Another object of the invention is to provide a meter connecting device in which the means for insulating the gas supply pipe from the house pipe consists of a tubular part which is formed of rigid insulating material such as molded plastic and forms the intermediate part of the vertical extending rotatably mounted sleeve.

Another object of the invention is to provide a meter connecting device of the type and character mentioned in which the vertically extending rotatably mounted sleeve is of unitary character and comprises in addition to the tubular intermediate part of insulating material, a tubular metallic upper part which embodies a screw thread for connecting it to one of the gas pipes and is so connected to the intermediate part, that it and the intermediate part are positively locked together against separation and relative rotation, and a tubular metallic lower part which embodies a screw thread for connecting it to the upper end of the depending coupling nipple and is so connected to the intermediate part that it and the intermediate part are positively locked against separation and relative rotation.

A further object of the invention is to provide a meter connecting device of the type and character under consideration in which the sleeve-equipped end of the crossbar has a vertically extending open ended socket and the intermediate part of the sleeve fits rotatably in, and extends throughout, the socket and embodies at its upper end an outwardly extending annular flange which overlies the portion of the crossbar that defines the upper end of the socket, and serves to insulate the upper part of the sleeve from said portion of the crossbar.

A still further object of the invention is to provide a meter connecting device which is generally of new and improved construction, effectively and efficiently fullfills its intended purpose and is capable of being mounted in place with facility and also manufactured at a comparatively low cost.

Other objects of the invention and the various advantages and characteristics of the present meter connecting device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals denote corresponding parts throughout the several views:

Figure 1 is a side view showing a meter connecting device embodying the invention in connected relation with a gas supply pipe, a house pipe and a conventional gas meter;

Figure 2 is a vertical longitudinal section of the sleeve-equipped end of the crossbar of the device, the sleeve being shown in side elevation;

Figure 3 is a vertical section of the vertically extending rotatably mounted unitary sleeve of the device;

Figure 4 is a similar section of the sleeve but taken at right angles to the section constituting Figure 3;

Figure 5 is a bottom perspective of the tubular metallic upper part of the sleeve;

Figure 6 is a top perspective of the intermediate part of the sleeve; and

Figure 7 is a side elevation of the lower part of the sleeve.

The device that is shown in the drawing constitutes the preferred form or embodiment of the invention and is adapted for use in connecting a gas meter 8 to a gas supply pipe 9 and a house pipe 10. The meter 8 is of standard or conventional construction and embodies a box-like casing 11 having a gas inlet tube 12 at one side thereof and a gas outlet tube 13 at its other side. The tubes extend vertically and have the upper ends thereof disposed above the top of the meter casing 11 and provided with external screw threads. The gas supply pipe 9 extends horizontally and is connected to, and leads from, a gas main (not shown). The house pipe 10 extends vertically and serves to conduct gas from the meter 8 to gas consuming appliances (not shown). The discharge end of the gas supply pipe 9 and the receiving end of the house pipe 10 are spaced a short distance apart and overlie the meter 8.

The device comprises a horizontally extending crossbar 14, a depending coupling nipple 15 at one end of the crossbar and a sleeve 16 and a depending coupling nipple 17 at the other end of the crossbar.

The crossbar 14 is preferably in the form of a one-piece metallic casting and extends between the discharge end of the supply pipe 9 and the receiving end of the vertically extending house pipe 10. It overlies, and is spaced above, the meter 11 and embodies integral hollow L-shaped head 18 at the end thereof that is adjacent the discharge end of the gas supply pipe 9. The head 18 consists of a horizontally extending part 19 and a vertically extending part 20. The outer end of the horizontally extending part 19 of the head 18 extends around the discharge end of the gas supply pipe 9 and is connected thereto by a screw thread connection 21. The vertically extending part 20 of the head 18 is located inwards of the horizontally extending part 19 and has the upper end thereof connected to, and in communication with, the inner end of the part 19. The lower end of the vertically extending part 20 is open and has an internal screw thread 22. The end of the crossbar 14 that is adjacent the receiving end of the house pipe 10 is provided with an integral cylindrical enlargement 23 which extends vertically and has formed in it a vertically extending open ended socket 24 of circular cross-section. Preferably, the socket 24 is downwardly tapered to a small degree or extent.

The depending coupling nipple 15 is of the "off-set" type and extends between, and serves to connect, the head 18 and the vertically extending tube 12 of the gas meter 8. The upper end of the coupling nipple 15 extends into the lower end of the vertically extending part 20 of the head 18 and embodies an external screw thread 25 which interfits with the internal screw thread 22. The lower end of the coupling nipple 15 is provided with a coupling ring 26 for connection to the external screw thread on the upper end of the inlet tube 12 of the meter. When the meter connecting device is in assembled relation with the gas pipes and the gas meter, the gas emanating from the discharge end of the gas supply pipe 9 flows first through the head 18, then downwards through the off-set coupling nipple 15 and then through the inlet tube 12 and into the meter 8.

The sleeve 16 extends vertically and with the depending nipple 17 forms means for connecting the upper end of the outlet tube 13 of the meter 11 to the lower or gas receiving end of the service pipe 10. It extends through, and is rotatably mounted in, the vertically extending open ended socket 24 in the cylindrical enlargement 23 of the crossbar 14 and is of unitary character. As shown or illustrated in the drawing, the sleeve 16 is of composite character and comprises a tubular upper part 27, a tubular lower part 28 and a tubular intermediate part 29. The upper part 27 is formed of metal. It is disposed for the most part above the cylindrical enlargement 23 of the crossbar 14 and consists of an upper end portion 30, a lower end portion 31 and an outwardly extending annular flange 32 between the upper and lower end portions. The upper end portion 30 of the upper part 27 of the sleeve is circular in cross-section and embodies an internal screw thread 33 for connection to an external screw thread 34 on the receiving end of the vertically extending house pipe 10. The outer periphery of the upper end portion 30 is provided with an annular series of vertically extending knurls 35 in order that the sleeve may be gripped by a wrench or similar turning tool in connection with application of the upper end part 27 of the sleeve to the receiving end of the service pipe 10. The lower end portion 31 of the upper part 27 embodies on its lower extremity a pair of diametrically opposite integral, outwardly extending arcuate flanges or ears 36. The external diameter of the lower end portion 31 of the upper part 27 of the sleeve is materially less than the diameter of the upper end of the vertically extending open ended socket 24. The outwardly extending annular flange 32 of the upper part 27 of the sleeve overlies, and is spaced a small distance above, the upper end of the cylindrical enlargement 23 of the crossbar 14 when the sleeve is in its operative position. Two straight parallel grooves 37 are formed in the bottom surface of the outwardly extending annular flange 32. Such grooves face downwards and are located at right angles to the direction of extent of the arcuate ears 36. The purpose of the grooves 37 will appear hereafter. The lower part 28 of the sleeve 16 is formed of metal and underlies, and is spaced a small distance from, the upper part 27. It is disposed for the most part beneath the lower end of the cylindrical enlargement 23 of the crossbar 14 and embodies on its upper end portion an integral outwardly extending annular upper flange 38 and an integral outwardly extending lower flange 39. Such flanges are spaced apart and define between them an annular external groove 40. The flange 38 is provided on the outer periphery thereof with an annular series of vertically extending knurls 38ª. The lower end portion of the lower part 28 of the sleeve is provided with an internal screw thread 41 and an external screw thread 42. A nut 43 is mounted on the external screw thread 42 and serves when tightened to lock the sleeve 16 against turning or rotation relatively to the cylindrical enlargement 23 of the crossbar 14. When the nut is tightened to its fullest extent, it abuts against the lower end of the enlargement 23 as shown in Figures 1 and 2 of the drawing. The intermediate part 29 of the sleeve 16 is disposed between the upper and lower parts 27 and 28 and is formed of insulating material. Preferably, the intermediate part is formed of rigid molded nylon or like "plastic" material. The intermediate part 29 fits within, and extends throughout, the vertically extending open ended socket 24 in the cylindrical enlargement 23 of the crossbar 14 and serves electrically to insulate the upper part 27 of the sleeve 16 from the lower part 28. The outer periphery of the intermediate part 29 is shaped conformably to the socket 24. The upper end portion of the intermediate part 29 surrounds the lower end portion 31 of the upper part 27 of the sleeve and embodies at its upper extremity an integral outwardly extending annular flange 44 and a pair of integral upwardly extending parallel ribs 45. The flange 44 abuts against, and has the same external diameter as, the outwardly extending annular flange 32 of the upper part 27 of the sleeve and serves to space and insulate the flange 32 from the upper end of the cylindrical enlargement 23. The ribs 45 extend across and upwards from the top surface of the flange 44. They are shaped conformably to, and fit within, the downwardly facing grooves 37 in the bottom surface of the outwardly extending annular flange 32 and coact therewith positively to lock the upper part 27 and the intermediate part 29 against relative rotation. The central portion of the intermediate portion 29 of the sleeve is provided with an integral inwardly extending annular flange or web 46, which, as shown in the drawing, extends between the lower end portion of the upper part 27 and the upper end portion of the lower part 28 of the sleeve 16. The portion of the intermediate part that directly overlies the inwardly extending flange 46 is provided with a pair of diametrically opposite inwardly facing arcuate grooves 47. The latter are shaped conformably to, and are in interfitting relation with, the diametrically opposite outwardly extending arcuate ears 36 on the lower extremity of the lower end portion 31 of the upper sleeve part 27 and coact therewith positively to lock the upper part 27 and the intermediate part 29 of the sleeve against separation as well as to augment the action of the ribs 45 and grooves 27 in preventing relative turning movement between the parts 27 and 29. The lower end portion of the intermediate part 29 surrounds the upper end portion of the lower sleeve part 28 and embodies at its lower extremity an integral inwardly extending annular flange 48. Such flange fits within the annular outwardly facing groove 40 and coacts therewith positively to lock the lower sleeve part 28 and the intermediate sleeve part 29 against separation. The portion of the inner periphery of the intermediate sleeve part 29 that directly overlies the flange 48 is provided with an annular series of vertically extending knurls 49 which interfit with the knurls 38ª on the flange 38 and coact therewith positively to lock the lower sleeve part 28 and the intermediate sleeve part 29 against relative turning or rotation. In forming the sleeve 16, the upper and lower sleeve parts 27 and 28 are placed in a suitable mold and then the intermediate sleeve part 29 is formed by introducing nylon or other "plastic" material in a plastic condition and under pressure into the mold. Upon hardening or curing of the nylon or other "plastic" material, the intermediate part 29 of the sleeve is formed.

The coupling nipple 17, like the coupling nipple 15, is of the "off-set" variety. It embodies at its upper end an external screw thread 50 whereby it is connected to the internal screw thread 41 on the lower end portion of the lower sleeve part 28. The lower end of the coupling nipple 17 is provided with an internally threaded coupling ring 51 for connection to the externally threaded upper end of the outlet tube 13 of the meter 11. When the meter connecting device is in assembled relation with the gas supply and service pipes 9 and 10 and the meter 11, gas under pressure after flowing through the meter flows upwards through the coupling nipple 17 and the composite unitary sleeve 16 and enters the receiving end of the house pipe 10.

The device is assembled by first removing the sleeve 16 from the cylindrical enlargement 23 of the crossbar 14. This is accomplished by removing the nut 43 and then shifting the sleeve upwards so as to withdraw it from the socket 24. After removal of the sleeve the upper part 27 is connected to the receiving end of the house pipe 10. Thereafter the crossbar is manipulated so as to align the socket 24 with the sleeve. After such manipulation, the crossbar is shifted upwards so as to cause the intermediate sleeve part 29 to be seated in the socket 24. After this step or operation, the nut 43 is applied to the external screw thread 42 on the lower end portion of the lower sleeve part 28 and is tightened to its fullest extent so as to lock the sleeve in the socket 24. Thereafter, the discharge end of the gas supply pipe 9 is connected to the outer end of the horizontally extending part 19 of the head 18 of the crossbar 14. Thereafter, the coupling nipple 15 is connected to the vertically extending part 20 of the head 18 and the upper end of the coupling nipple 17 is connected to the lower part 28 of the sleeve 16. At the conclusion of this operation, the lower ends of the coupling nipples are connected to the upper ends of the meter tubes 12 and 13 by way of the coupling rings 26 and 51. When the device is in its fully assembled position, the intermediate sleeve part 29 of insulating material serves electrically to insulate the service pipe 10 from the crossbar 14, the meter 11 and the gas supply pipe 9. By insulating the house pipe 10 from the gas supply pipe any electric current that is carried by the service pipe is not conducted to the supply pipe and hence the gas main to which the supply pipe is connected is not subjected to electrolysis with resultant deterioration.

The herein described meter connecting device effectively and efficiently fulfills its intended purpose and may be produced at a reasonable cost. It may be installed with facility and is characterized by the fact that it embodies simple and novel means whereby the gas supply and house pipes with which it is associated are electrically insulated from one another.

Whereas the device has been described as embodying but a single sleeve, it is to be understood that the device may for certain installations have a composite unitary sleeve at each end of the crossbar. It is also to be understood that the invention is not to be restricted to the details set forth since these may be modified within the scope of the appended claims without departing from the spirit and scope of the invention.

Having thus described the invention what we claim as new and desire to secure by Letters Patent is:

1. A device designed for use in connecting the side tubes of a conventional gas meter to a pair of gas pipes, said device comprising a horizontally extending metallic crossbar provided at one end thereof with means for connecting one of the meter tubes to one of the pipes and having at its other end an enlargement with a vertically extending open-ended socket therethrough, and a composite sleeve having a central bore and extending through and rotatable relatively to the socket, said sleeve comprising a tubular metallic upper part disposed for the most part above the enlargement, provided at its upper end portion with means for connecting the same to the other pipe, embodying on its central portion an outwardly extending annular flange in overlying and spaced relation to the upper end of the enlargement, and provided on its lower extremity with a pair of radially extending oppositely directed ears of less radial extent than the radial extent of said outwardly extending flange, a tubular metallic lower part spaced from the upper part, disposed for the most part below the enlargement, provided at its upper end with an outwardly extending annular flange, and provided at its lower end portion with means for connecting the same to the other meter tube, and a tubular intermediate part formed of a moldable insulating dielectric material, fitting snugly and rotatably in and extending into and through a major axial extent of the socket, said intermediate part having its upper end portion molded around the lower end portion of the upper part including said radially extending ears in coextensive face-to-face relation and provided adjacent its upper extremity with an outwardly extending annular flange in full underlying and face-to-face contact with the outwardly extending flange on the central portion of the upper part and in overlying and face-to-face contact with the upper rim of said enlargement, said intermediate part having its lower end portion molded around the upper end portion of the lower part including said outwardly extending annular flange thereon in coextensive face-to-face relation, said ears on the lower extremity of the upper part and said annular flange on the upper end portion of the lower part being, by virtue of the molding operation, embedded within the moldable material of the intermediate part with the non-circular contour of the intermediate part in the vicinity of said ears on the lower extremity of the upper part serving to prevent relative rotation between the upper and intermediate parts, said intermediate part being further formed with an internal web in the medial regions thereof underlying the lower rim of said upper part and overlying the upper rim of said lower part, both in face-to-face relation, said intermediate part maintaining said upper and lower parts out of physical and electrical contact with each other.

2. A device for use in connecting the side tubes of a conventional gas meter to a pair of gas pipes as claimed in claim 1 wherein the underneath face of said outwardly extending annular flange is formed with a pair of straight linear downwardly facing parallel grooves extending in chordal relation across the underneath face of the flange of opposite sides of said bore, the upper end of said intermediate part also being molded to the underneath face of said latter outwardly extending annular flange including said grooves whereby said grooves interlock with said intermediate part and further prevent relative rotation between the upper and intermediate parts.

References Cited in the file of this patent

UNITED STATES PATENTS

| | | | |
|---|---|---|---|
| Re. 20,308 | McKee | Mar. 23, | 1937 |
| 320,645 | Fischer | June 23, | 1885 |
| 764,603 | Lambert | July 12, | 1904 |
| 1,061,527 | Davis | May 13, | 1913 |
| 1,282,024 | Bartholomay | Oct. 22, | 1918 |
| 1,606,837 | Horn | Nov. 16, | 1926 |
| 1,862,153 | Lee | June 7, | 1932 |
| 1,868,037 | Weatherhead | July 19, | 1932 |
| 2,039,748 | Stevens | May 5, | 1936 |
| 2,396,078 | Box | Mar. 5, | 1946 |
| 2,467,036 | Iftiger | Apr. 12, | 1949 |
| 2,574,191 | Platzer | Nov. 6, | 1951 |

FOREIGN PATENTS

| | | |
|---|---|---|
| 24,433/35 | Australia | Sept. 13, 1935 |
| 22,635/35 | Australia | July 9, 1936 |